July 25, 1972  F. W. KNIGHT ET AL  3,679,417
SIMPLIFIED DIFFUSION-TRANSFER FILM PRODUCTS
Filed June 30, 1970  2 Sheets-Sheet 1

INVENTOR
FRANK W. KNIGHT
DAVID E. VAN ALLN
BY Brown and Mikulka
and
Robert L. Berger
ATTORNEY

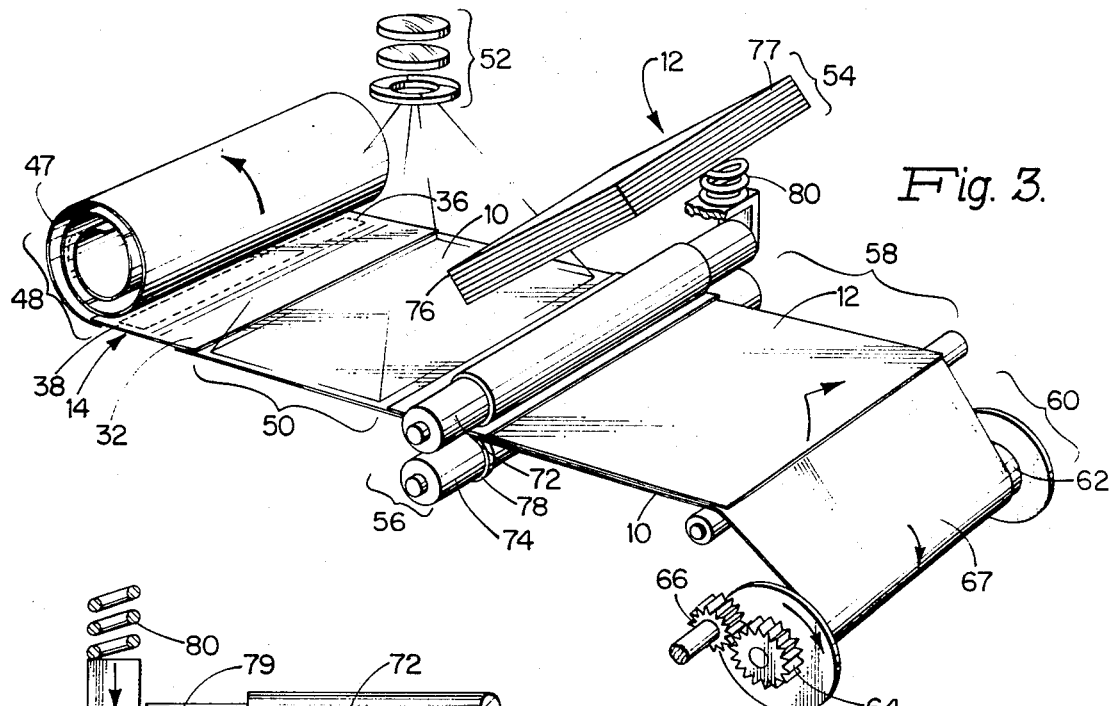
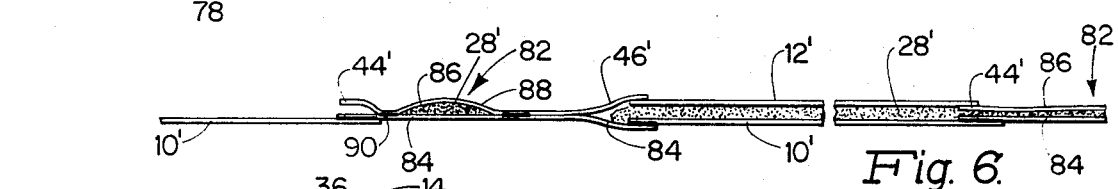
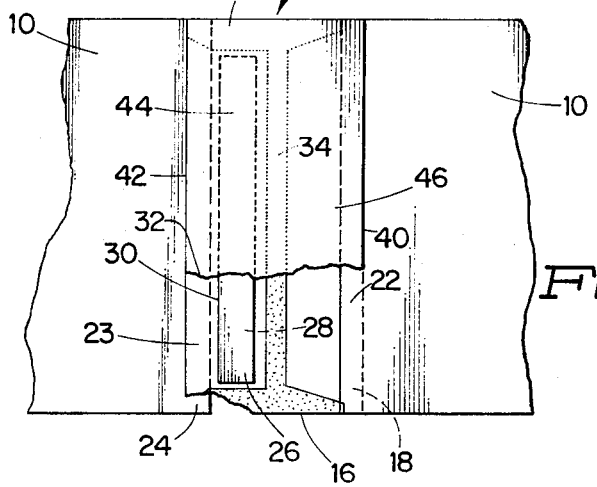

United States Patent Office 3,679,417
Patented July 25, 1972

3,679,417
SIMPLIFIED DIFFUSION-TRANSFER FILM PRODUCTS
Frank W. Knight, Salem, N.H., and David Van Allen, Malden, Mass., assignors to Polaroid Corporation, Cambridge, Mass.
Filed June 30, 1970, Ser. No. 51,250
Int. Cl. G03c *1/48, 3/00*
U.S. Cl. 96—78                        19 Claims

ABSTRACT OF THE DISCLOSURE

A plurality of sheets connected together by pod assemblies to form a flexible elongated strip of materials and a plurality of individual second sheets of photographic material each of which is adapted to overlie one of the aforementioned sheets to facilitate the production of a photographic print. Each pod assembly includes a carrier sheet connecting adjacent first mentioned sheets and which has a rupturable container of processing fluid extending thereacross in spaced apart relationship to each such adjacent first-mentioned sheet. Further, each such pod assembly includes a bib extending over the adjacent edge of one of the first-mentioned sheets connected thereto and a trapping sheet extending over the adjacent edge of the other first-mentioned sheet connected thereto. When positioned over a first-mentioned sheet each second photographic sheet has one of its edges disposed over the bib of one pod assembly while the opposite edge thereof is disposed under the trapping sheet of the next pod assembly. Typically, each first-mentioned sheet may include an image-recording component and each second sheet may comprise an image-receiving component.

BACKGROUND OF THE INVENTION

Field of the invention

This invention relates to photography and, more particularly, to novel film products useful in diffusion-transfer type photographic operations.

Description of the prior art

There are a number of photographic processes which may be effected by distributing a processing fluid in a uniformly thin layer between a pair of superposed sheets. Generally, one of the superposed sheets comprises a photosensitive image-recording material and the second sheet may merely aid in distributing the processing fluid over the first sheet or may, if desired, also possess other characteristics. The processing fluid, in processes with which the present invention is typically concerned, is usually of a viscous type, initially being retained in a rupturable container carried on one of the superposed sheets.

In these processes, the photosensitive sheet is first exposed and then superposed with respect to the second sheet. The two superposed sheets are then moved relative to and between a pair of juxtaposed members. These members may comprise a pair of substantially parallel rollers, a roller and a non-rolling member, or any other apparatus that will, as the sheets are moved through it first collapse the fluid carrying pod or container, thereby forcing the fluid out of the container and between the superposed sheets as a mass extending transversely across the sheets and, second, distribute the fluid from this mass so as to produce an approximately uniform fluid layer between the desired portions of the superposed sheets.

In order to insure that a fluid layer of the desired thickness covers the entire area of interest, an amount of processing fluid in excess of that required merely to carry out the desired process is usually provided in the container. The amount of excess fluid that must be supplied depends, among other things, on the relative distribution of the fluid within the container, the distribution of the original fluid mass as it is forced out of the container, and the uniformity with which this mass is distributed between the superposed sheets. It is generally the practice to provide means on the sheet materials for trapping that portion of the fluid which is excess after the spreading process has been completed.

Further, in order to control the flow of the fluid from the pod into position between the superposed sheets, it has been the practice to provide a bib or similar arrangement associated with one of the sheets. Also, one of the sheets normally has associated therewith a masking arrangement to define a border or frame around the finished photographic product, as well as rails which, in conjunction with the masking arrangement define the areas of the sheet materials adapted to be contacted by the processing fluid and the thickness of the layer of such fluid spread therebetween as the film unit moves between the juxtaposed force applying members. To facilitate the proper transport of the sheet materials within the camera system and/or the subsequent withdrawal of such materials from that system, it has been necessary to provide a substantial amount of leader material associated with one or both of such sheets.

These auxiliary components, i.e., pods, leaders, rails, masks, bibs and traps represent significant elements of cost in the production of finished prints by the diffusion-transfer process. Additionally, after each photographic print of the diffusion-transfer type has been made, the photographer has traditionally been required to handle and dispose of considerable waste material. Such waste material may not only include the above-mentioned auxiliary film components, but also the processed negative emulsion bearing sheet. This task has proved to be somewhat of an inconvenience to the operator and one which, in some instances, can be quite messy considering the fact that certain of these materials are wetted with processing fluids.

An important object of this invention, therefore, is to provide improved film products for use in a self-developing camera.

Another primary object of this invention is to provide relatively inexpensive film products of the type indicated.

An additional object of this invention is to provide improved film products which may be employed in a camera of the self-developing type to provide a substantially waste-free system.

A further object of this invention is to provide improved film products for use in a self-developing camera which significantly reduces the amount of auxiliary components heretofore associated with film products of the same general type.

Still an additional object of this invention is to provide an improved pod assembly useful for connecting a plurality of sheets together to form an elongated strip or roll of materials and for selectively treating such sheets with processing fluid.

Also, an object of this invention is to provide an improved pod assembly for connecting a plurality of photographic sheets together into an elongated strip and which includes fluid flow control and fluid trapping arrangements.

Still another object of this invention is to provide an improved pod assembly adapted to be connected to a first sheet of material which includes an arrangement facilitating the advancement of a second sheet of photographic material through a pair of compressive force applying members in superposed relationship with the first-mentioned sheet.

SUMMARY OF THE INVENTION

Briefly stated, the present invention comprises a unique pod assembly which is employed to connect adjacent sheets of material together to form an elongated strip of materials comprising alternately spaced pod assemblies and sheets. Each pod assembly includes a carrier sheet having opposite edges attached to respective edges of adjacent sheets. In the illustrated embodiments of the invention, these sheets comprise a photosensitive image-recording component. Extending across the carrier sheet is a rupturable container of processing fluid disposed intermediate of and spaced apart from the aforementioned opposite edges of that sheet. This container is adapted to release the fluid retained therein in a predetermined manner in the direction of one of the image-recording sheets connected to its carrier sheet responsive to a compressive force being applied thereto. A bib extends from the assembly comprising the rupturable container and the carrier sheet into overlapping relationship with the adjacent edge of one of the image-recording sheets and is arranged to control the flow of the fluid onto that sheet as it is released from the container. Extending from the assembly comprising the rupturable container and the carrier sheet into overlapping relationship with the adjacent edge of the image-recording sheet connected to the carrier sheet is a trapping sheet which is arranged to cooperate with a portion of the carrier sheet to provide a space in which a certain amount of processing fluid may eventually be accumulated.

The above-described elongated strip of materials is adapted to be employed in conjunction with a plurality of second sheets of photographic materials in cameras of the self-developing type to produce photographic prints by a diffusion-transfer process. In the illustrated embodiments of the invention, each of these second photographic sheets comprises an image-receiving component provided with a resist frame defining the border of the finished print. Each such image-receiving sheet is configured to be superposed over one of the image-recording sheets after exposure thereof with one of its edges disposed over a portion of the bib associated with that particular image-recording sheet and with its opposite edge disposed under a portion of the trapping sheet associated with that particular image-recording sheet. In this manner, the trapping sheet serves to advance the second sheet along with its superposed image-recording sheet as the latter is moved through a pair of fluid-spreading elements housed in the camera system. Means are provided on the spreader elements to establish a pre-gap between their sheet contacting surfaces to facilitate the initial introduction of the film units therebetween. After exposure of one of the photosensitive image-recording sheets and as that sheet is moved towards the fluid-spreading elements in superposed relationship with one of the image-receiving sheets, the pod positioned in advance thereof is ruptured by the compressive force of the spreader elements and the fluid released therefrom is introduced between the superposed sheets by the bib associated therewith. As the superposed sheets move through the fluid-spreading elements, the compressive force exerted thereon by such elements effects the spreading of the fluid therebetween in a substantially uniform layer. The thickness of this layer is a function of the pre-gapped distance between the sheet contacting surfaces of the spreader elements. When the superposed sheets pass from between the fluid-spreading members, any excess fluid is introduced under the trapping sheet of the next pod assembly.

After the layer of processing fluid disposed between the sheet materials has effected the formation of a visible image in the image-recording sheet from the image recorded on the photosensitive sheet during exposure thereof, the former sheet is withdrawn from the camera system. Then the image-recording sheet and expended pod assembly attached thereto is coiled within the camera for temporary retention purposes. This arrangement eliminates the requirement for masks and rails, reduces the amount of leader materials, simplifies the bib and trap arrangements and provides for a substantially waste-free camera operation.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiments when read in connection with the accompanying drawings wherein like numbers have been employed in the different figures to denote the same parts and wherein:

FIG. 3 is a figure similar to FIGS. 1 and 2 depicting the first image-receiving sheet and image-recording components in their position for imbibition with the second photosensitive component disposed in position for its exposure;

FIG. 4 is a partially cutaway fragmentary diagrammatic plan view illustrating the pod assembly employed in the film product depicted in FIGS. 1–3;

FIG. 5 is a fragmentary diagrammatic sectional view in profile illustrating a section of the film unit depicted in FIG. 1–3 passing between the fluid spreading elements; and FIG. 6 is a fragmentary diagrammatic longitudinal sectional view of an alternate embodiment of the film product of this invention.

DESCRIPTION OF A PREFERRED EMBODIMENT

Figure 1:
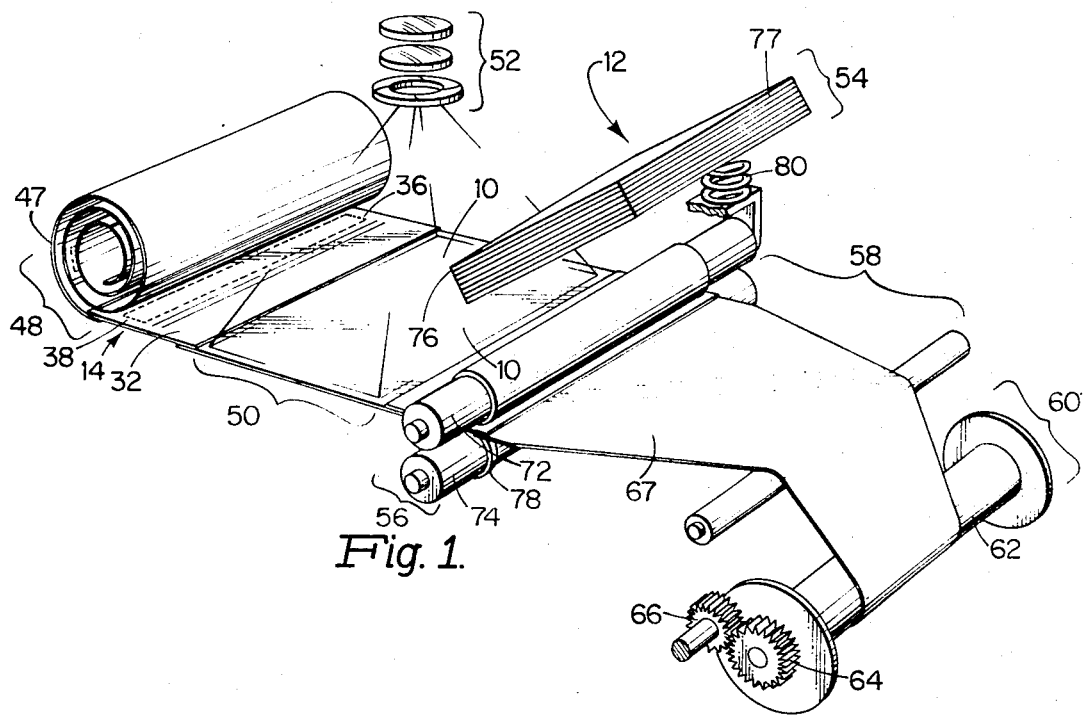
FIG. 1 is a diagrammatic perspective view depicting the novel film product of the present invention at such time as the first photosensitive component thereof is disposed in position for exposure operations.

The production of a visible image by a diffusion-transfer process, whether of the black-and-white or full-color variety, has most frequently employed the use of two sheets of material. One of these sheets includes a photosensitive image-recording layer, and an image-receiving component may either be associated with that same sheet or with the second sheet. As previously indicated, in carrying out the photographic process after the photosensitive medium has been exposed to image-carrying light rays to record a latent image therein, a suitable processing fluid is spread as a thin layer between the two sheets of material by drawing the sheets in superposed relationship between a pair of compressive force applying members while the fluid is being fed between the sheets. In the former situation, i.e., wherein both the image-recording and image-receiving components are contained in the same sheet, the second sheet primarily serves to facilitate the spreading of the fluid across that sheet, but may also serve to subsequently strip the processed image-recording component from that sheet.

For example, in producing a black-and-white print by a diffusion-transfer process, a first flexible image-recording sheet may comprise a support formed of baryta paper, or of a plastic such as cellulose acetate, with a photosensitive layer on one side thereof in the form of a silver halide gelatin emulsion. The processing liquid may comprise an aqueous alkaline solution of a silver halide developer, a silver halide complexing agent and a thickening or film-forming agent such as sodium carboxymethyl cellulose, which last stated constituent facilitates the dispensing and distribution of the processing fluid and the adherence of the two sheets to one another once the fluid has been spread therebetween. A flexible image-receiving sheet may comprise a support consisting of the same materials employed to form the support in the photosensitive sheet and a gelatin or polyvinyl alcohol silver-receptive medium wherein a positive image may be formed. When the image-recording sheet is exposed to actinic light and subsequently superposed with respect to the image-receiving sheet with a layer of the processing fluid distributed therebetween, the developing reagent in the fluid acts to develop the exposed silver halide in the negative emulsion to silver and to dissolve the non-exposed silver halide to provide an image forming component. The soluble silver complex comprising the image forming component migrates to the silver-receptive stratum of the image-receiving sheet where it is reduced to silver to provide a fixed positive of the latent image initially recorded in the photosensitive emulsion.

For example, in producing a print in full-color by a diffusion-transfer process, a first flexible image-recording sheet may comprise a support formed of baryta paper, or of a plastic such as cellulose acetate, on which are carried in sequence a cyan dye developer layer, a red sensitive silver halide emulsion layer, a spacer layer, a magenta dye developer layer, a green sensitive silver halide emulsion layer, a spacer layer, a yellow dye developer layer and a blue sensitive silver emulsion layer. A second flexible image-receiving sheet for use with this type of image-recording sheet may include a dye receptive layer comprising a dyeable polymer carried on a baryta paper, or a plastic, such as cellulose acetate, support.

A processing composition suitable for use with these sheet materials may comprise a liquid which, similar to the processing liquid employed in the black-and-white process is preferably of a generally viscous nature. A suitable viscosity-imparting agent for use in such a processing fluid is sodium carboxymethyl cellulose. When spread between the image-recording and image-receiving sheets, the processing liquid permeates or migrates into the various photosensitive and dye developer layers of the image-recording sheet. During permeation into the dye developer layers, unreacted dye developer contained in these layers is dissolved in the processing liquid and transported, in solution, into respective photosensitive layers to distribute unreacted dye developer in those layers. Where the dye developer, transported to the photosensitive layers, reacts with the exposed silver halide, it is oxidized as a function of the amount of silver halide reduced to silver while the oxidation product of the developer forms an image that is substantially co-extensive with the developed silver.

Preferably, the dye developer utilized is selected for its property of having an oxidation product as a result of silver development which is of considerably lower solubility in the liquid processing composition than the unreacted dye developer itself. Under these conditions, the oxidation product is substantially immobilized or retained in the respective photosensitive layers.

It is the formation of an insoluble oxidation product, i.e., an oxidation product which is at least sufficiently less soluble to preclude its diffusion to the image-receiving sheet during imbibition, that provides the principal mechanism for controlling the transfer of dye image-forming components to the image-receiving sheet. Thus, portions of the dye developer which have become oxidized are exhausted or made unavailable for dye image formation on the positive or image-receiving element. This immobilization of dye developer may also be due in part to a tanning effect on the emulsion by oxidized developing agent and in part to a localized exhaustion of alkali as a result of development.

At the time that the dye developer is developing silver and providing an insoluble oxidation product, and imagewise distribution of unoxidized and unreacted dye developer is formed in the negative material in places where unexposed silver halide grains are present or in places where exposure and subsequent development is less complete. Dye developer present in solution in this imagewise distribution is transportable, at least in part, by imbibition to the image-receiving sheet. The dye-receiving layer of that sheet is dyed or otherwise colored by the transported and unreacted dye developer where the dye developer is deposited to provide the desired reverse image in color of the latent image initially recorded in the image-recording sheet.

The image-receiving sheet, when stripped from the image-recording sheet, will contain substantially only dye developer which provides the desired color positive image. In this regard, the image-receiving element, during the processing thereof, is maintained free of appreciable amounts of material which, during the processing of the film unit or which in the presence of light and air, will impart to the image-receiving sheet a color that would adversely affect the visibility of the image of dye developer formed therein.

Film systems of these types, including appropriate processing compositions, as well as of other types applicable for use in connection with the present invention for producing fully developed black-and-white and full-color images are well known in the art. For instance, typical such system are disclosed and described in greater detail in U.S. Pat. No. 2,543,181 of E. H. Land issued on Feb. 27, 1951 and U.S. Pat. No. 2,983,606 of H. G. Rogers issued on May 9, 1961.

In its illustrated embodiment, this invention comprises photographic film products including a photosensitive image-recording component incorporated in a first sheet of material and an image-receiving component incorporated in a second sheet of material associated therewith. It should be clearly understood, however, that the invention is not limited to such an arrangement, but is equally applicable for use with other two sheet processing systems in producing either black-and-white or full-color viewable images.

The present invention may best be understood by first referring to FIGS. 1–4 of the drawings. As may be seen therein, the novel film products of the invention include a plurality of photosensitive image-recording sheets 10 and a plurality of image-receiving sheets 12. These sheets 10 and 12 are of substantially the same size and shape so that each such image-receiving sheet may be selectively superposed over a respective image-recording sheet. Further, these sheets 10 and 12 may take the form of one of the types previously indicated and, as such, are preferably flexible in nature.

Adjacent photosensitive image-recording sheets 10 are connected together by pod assemblies 14, the details of which are best shown in FIG. 4. In this connection, each pod assembly 14 includes a carrier sheet 16 preferably having one of its lateral edge portions 18 lapped under and attached to the trailing lateral edge portion 22 of one adjacent image-recording sheet 10 and its other lateral edge portion 23 lapped over and attached to the leading lateral edge portion 24 of the other image-recording sheet adjacent thereto. Each carrier sheet 16 may, for instance, be formed of flexible baryta paper which is bonded to the adjacent image-recording sheets 10 by any suitable adhesive. Mounted on each carrier sheet 16 and extending laterally thereacross intermediate of, and in spaced apart relationship to, the carrier sheet's lateral edge portions 18 and 23 is an elongated rupturable pod or container 26 in which is initially retained a quantity of processing fluid 28, of a type previously indicated, slightly in excess of that required to treat the surface of one image-recording sheet 10.

Pods or containers of this general type are now well known and may, for instance, be formed of sheet materials, which are flexible and deformable, bonded together in the vicinity of their peripheral edge surfaces to form a cavity therebetween containing the processing fluid 28. In this manner, whenever an externally mounted force applying member is pressed against the container 26, an hydraulic pressure is transmitted to the processing fluid 28 retained therein which, when such pressure reaches a predetermined level, causes the container to rupture and the fluid to be released therefrom. It is desirable that the walls of the container 26 be substantially impervious to the processing fluid 28 and inert to attack by that fluid. Typically, they may consist of an outer layer of pouch or glassine paper, an intermediate layer of lead foil and an interliner of polyvinylchloride material. Under proper pressure and temperature conditions, the polyvinyl liners may be bonded together to effect the sealing of the fluid-filled cavity.

In order that the fluid 28 within the container 26 is released therefrom in a predetermined manner upon rupture thereof, i.e., in the direction of one of the adjacent image-recording sheets 10, it is important that the seal along the lateral edge 30 of the container be substantially weaker than the seals along the other marginal sections thereof. This result may readily be effected during fabrication of the container by appropriately adjusting the heat and/or pressure employed to effect the weakened seal along its lateral edge 30. Any suitable adhesive may be employed to attach the pod or container 26 to its carrier sheet 16.

Overlaying each carrier sheet 16 and container 26 mounted thereon is another sheet of flexible material 32 which, for instance, may also be formed of baryta paper. A relatively narrow lateral portion 34 of this sheet 32 is bonded by a suitable adhesive to the carrier sheet 16 adjacent the rupturable container 26 on the side thereof removed from its lateral edge 30. Also, the longitudinal edge portions 36 and 38 of this sheet 32 are bonded in a similar manner to the adjacent sections of the carrier sheet 16. It will be noted that the lateral edges 40 and 42 of the sheet 32 respectively overlap the adjacent longitudinal edges 22 and 24 of the leading and trailing photosensitive image-recording sheets 10 connected to each pod assembly's carrier sheet 16. Thus, the flexible sheet 32 is effectively divided into a first section overlying and extending beyond the container 26 constituting a bib 44 and a second section constituting a trapping sheet 46. Means are therefore provided as part of each pod assembly 14 in the form of a bib 44 for controlling the flow of the fluid 28 as it is released from the container 26 onto the trailing image-recording sheet 10 connected to that pod assembly. Also, means are provided on each pod assembly 14 in the form of the trapping sheet 46 for cooperating with the section of the carrier sheet 16 adjacent thereto to define a space wherein excess processing fluid 28 spread across the other image-recording sheet 10 attached to that particular pod assembly may be trapped or accumulated.

It will be appreciated that this arrangement of pod assemblies 14 and photosensitive image-recording sheets 10 provides an elongated strip of photographic materials 47 comprising alternately spaced pod assemblies and image-recording sheets which is readily coilable. As will subsequently be explained in more detail, such an elongated strip of photographic materials 47 is adapted to be employed in conjunction with a plurality of discrete image-receiving sheets 12 within a camera of the self-developing type to provide a substantially waste-free photographic operation. Since various details of a camera system in which the heretofore described photographic film products are devised to be employed do not form part of the present invention they are not illustrated in the drawings forming part of this specification. However, such a camera system may, if desired, take the form of that shown and described in copending application Ser. No. 51,191 entitled "Unique Waste-Free Camera System of the Self-Developing Type" filed by D. Van Allen and F. Knight on June 30, 1970.

In any event, it is desirable that such a camera system include a station 48 for initially receiving a coiled strip of photographic materials 47; an exposure station 50 wherein image-carrying light rays from a subject may be selectively imaged by the camera's shutter and objective lens arrangement 52 onto one such image-recording sheet at a time; a station 54 for initially storing a supply of image-receiving sheets 12 and including means for sequentially positioning individual such image-receiving sheets over respective exposed image-recording sheets 10 within the exposure station; a fluid spreading station 56; an imbibition station 58; and a station 60 housing means for selectively advancing the image-recording sheets 10 through the camera and for temporarily storing such expended sheets 10 and associated pod assemblies 14 as they are removed from the imbibition station 58.

Removably and rotatably mounted within the last stated station 60 of the camera system is a reel 62 to which the elongated strip of photographic materials 47 may be initially connected and subsequently progressively coiled around. In this connection, the reel 62 is provided with a spur gear 64 adapted to mesh with the teeth of a pinion 66 journaled in the frame structure of the camera system whenever the reel is mounted therein. The pinion 66 may be designed for either manual or automatic operation. To facilitate the proper initial arrangement of the elongated strip of photographic materials 47 within the camera system, a leader 67 is attached to the first image-recording sheet 10 thereof and is adapted to extend from the camera's receiving station 48 through the intermediate camera stations 50, 56 and 58 into the station 60 where it may be attached to the reel 62. It will thus be appreciated that subsequent rotation of the pinion 66 in a counterclockwise direction as viewed in FIGS. 1–3 will advance the first image-recording sheet 10 into position within the exposure station 50 (see FIG. 1). At such time, the leading pod assembly 14 of the elongated strip of photographic materials 47 is disposed immediately in front of a pair of juxtaposed fluid spreading rollers 72 and 74. For reasons which will become obvious, this leading pod assembly 14 need not include a trapping sheet 46. Similarly, for reasons which will subsequently become obvious, the last pod assembly 14 of the elongated strip of photographic materials 47 need not include a bib 44.

Figure 2:
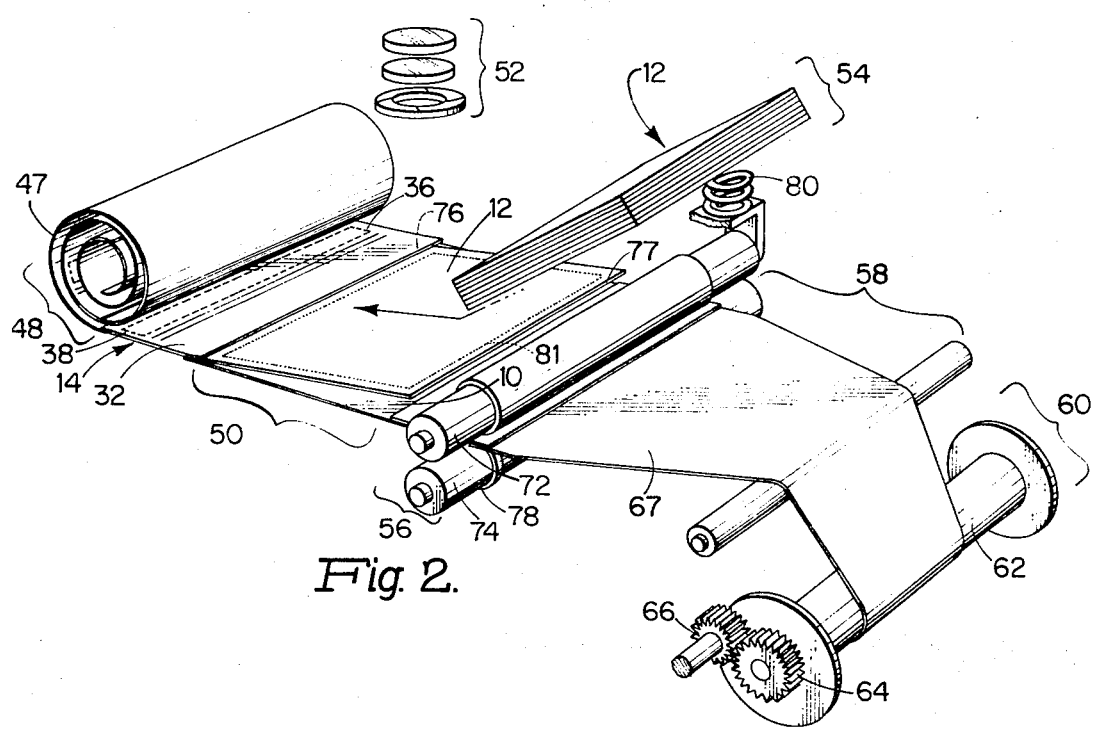
FIG. 2 is a view similar to FIG. 1 depicting an image-receiving sheet being superposed over the first photosensitive component after exposure thereof.

After this leading photosensitive image-recording sheet 10 has been exposed, means (not shown) within the camera system advances a first image-receiving sheet 12 into superposed relationship therewith (see FIG. 2). During such operation, the exposed image-recording sheet 10 is maintained in position within the camera system's exposure station 50. It is important to note that the trailing lateral edge 76 of this superposed image-receiving sheet 12 is positioned under the trapping sheet 46 of the second pod assembly 14. Therefore, as the first exposed image-recording sheet 10 continues its advance through the camera's fluid spreading station 56 and into its imbibition station 58, this arrangement of the image-receiving sheet 12 and the trapping sheet 46 facilitates concurrent movement of the image-receiving sheet 12 through the camera system in superposed relationship therewith. Also it is important to note at this time that, when the image-receiving sheet 12 is superposed over the image-recording sheet 10 within the camera's exposure station 50, its leading lateral edge 77 is disposed over the lateral edge 42 of the first pod assembly's bib 44. The purposes for these particular arrangements will be explained hereinafter.

By now further turning the pinion 66 in a counterclockwise direction, the superposed exposed image-recording sheet 10 and image-receiving sheet 12 are advanced from the exposure station 50 through the fluid spreading station 56 into the camera's imbibition station 58 (see FIG. 3). At the same time, this operation causes the second photosensitive image-recording sheet 10 of the elongated strip of photographic materials 47 to be advanced into exposure position within the camera's station 50.

The nature of, and mounting arrangements for, the camera's fluid spreading rollers 72 and 74 are best shown in FIG. 5 of the drawings. As depicted therein, the roller 74 is fixedly positioned within the camera for rotation about its axis. This roller 74 is provided with an annular collar 78 formed in the vicinity of each of its ends. The fluid spreading roller 72 is mounted for rotation about an axis parallel to the axis of rotation of the roller 74. However, it is also mounted within the camera system for a limited amount of displacement between a position wherein its cylindrical surface is seated against the collars 78 of the roller 74 and a second position wherein its cylindrical surface is spaced a small distance away from such collars 78. In this respect, a pair of springs 80 continually urge the roller 72 into contact with the roller 74.

The radial height of the collars 78 serve to establish a pre-gap between the sheet contacting surfaces of the rollers 72 and 74, which arrangement facilitates the disposition of the leader 67 associated with the elongated strip of photographic materials 47 between the camera's receiving station 48 and its station 60 at such time as the elongated strip is initially loaded into the camera. Further, the radial height of these collars 78 functions to establish the thickness of the layer of processing fluid 28 distributed between the superposed sheets 10 and 12 as they are advanced through the camera's fluid-spreading station 56. Typically, the radial height of these collars 78 would be on the order of .003 inch in situations involving the production of black-and-white prints and on the order of .007 inch in situations involving the production of full-color prints.

The fluid-spreading roller 72 includes an undercut or relieved annular section 79 adjacent each of its ends. These relieved sections 79 are disposed in juxtaposition with respect to the respective end portions of the roller 74 which extend beyond the collars 78.

As the superposed exposed image-recording sheet 10 and image-receiving sheet 12 are advanced from the camera's exposure station 50 towards the fluid spreading rollers 72 and 74, the pod assembly 14 in advance thereof first passes between these rollers. The compressive force thus exerted on the fluid filled container 26 causes that member to rupture along its lateral edge 30 and the fluid 28 initially retained therein to be expelled therefrom in the direction of the superposed sheets 10 and 12. Flow of the fluid 28 as it is expelled from the ruptured container 26 is controlled by the bib 44 associated with that container in a manner to facilitate the introduction of the released fluid between the superposed sheets 10 and 12. Inasmuch as the leading lateral edge portion of the superposed sheet 10 is disposed under the carrier sheet's edge portion 24, the leading edge of the sheet 10 does not present an obstruction to the flow of the fluid 28 from the container 26. As the superposed sheets 10 and 12 continue their advance through the camera's station 56, the fluid spreading rollers 72 and 74 act thereagainst under the influence of the springs 80 to effect the distribution of the released processing fluid 28 therebetween in a relatively thin layer of generally uniform thickness. The undercut sections 79 of the roller 72 in cooperation with the annular sections of the roller 74 in juxtaposition therewith function to relieve the pressure on the fluid 28 as it spreads between the superposed sheets 10 and 12 and towards the longitudinal edge thereof and thus preclude any of the processing fluid from escaping from between such longitudinal edge portions of those sheets during the fluid spreading process. This desirable situation is illustrated in FIG. 5 of the drawings.

Also, it should be noted at this time that a "resist" 81 is imprinted or otherwise formed around the peripheral border of the face of each image-receiving sheet 12 adapted to be contacted by the processing fluid 28. This resist 81 may comprise an acrylic plastic material, such as Krylon manufactured by Krylon, Inc. of Norristown, Pa., or any other material which will function to preclude the adherence of any of the processing fluid 28 thereto and any adverse discoloring of the border of the sheet 12 by that fluid.

As previously indicated, each container 26 is initially supplied with a quantity of fluid 28 slightly in excess of that required to process the photographic sheets 10 and 12. Therefore, just before these superposed sheets 10 and 12 leave the bite of the rollers 72 and 74, this excess amount of processing fluid 28 is expelled from between their trailing lateral edges and into the space provided by the trapping sheet 46 associated with the next pod assembly 14 and the section of the carrier sheet 16 adjacent thereto. Inasmuch as the trailing lateral edge portion of the superposed sheet 10 is disposed under the carrier sheet's edge portion 22, the leading edge of the carrier sheet does not obstruct flow of the excess fluid 28 under the trapping sheet 46. Additionally, in this arrangement the thickness of the sheet 10 functions to provide fluid storage space under the trapping sheet 46.

In this condition, the superposed exposed image-recording sheet 10 and image-receiving sheet 12 are retained within the camera station 58 for a predetermined amount of time sufficient to imbibe these sheet materials with the processing fluid 28 previously distributed therebetween and to facilitate the formation of a visible image in the image-receiving sheet 12 from the latent image recorded in the sheet 10 during the exposure operation. After the lapse of such predetermined amount of time, access means (not shown) provided in the camera structure adjacent the position of the superposed image-receiving sheet 12 within the camera's imbibition station 58 enables the operator to strip the image-receiving sheet, now constituting a finished photographic print, from its associated image-recording sheet and to withdraw same from the camera system. The portion of the sheet 12 comprising the resist 81 defines a border or frame for the finished print.

After the next photosensitive image-recording sheet 10 of the strip of photographic materials 47 has been exposed within the camera station 50 and overlaid with the next image-receiving sheet 12, the pinion 66 can once again be turned in a counterclockwise direction to simultaneously effect the processing of the second photographic print and the coiling of the expended photographic materials associated with the production of the first photographic print onto the reel 62. Once all of the photographic materials comprising the elongated strip 47 have been expended in the process of producing the photographic prints and coiled onto the reel 62, that reel may be removed from the camera system and disposed of as convenience may dictate.

DESCRIPTION OF AN ALTERNATE EMBODIMENT

An alternate embodiment of this invention is illustrated in FIG. 6 of the drawings wherein the same numerals primed have been employed to denote parts of that embodiment which remain substantially unchanged from the embodiment illustrated in the other figures of the drawings.

Referring now to that figure of the drawings, a pod assembly 82 is formed from two sheets 84 and 86 of suitable materials bonded together to define a rupturable pod or container 88 of processing fluid 28' having a weakened lateral edge seal 90, a carrier sheet comprising the sheet 84, a bib 44', and a trapping sheet 46'.

Those familiar with the photographic arts will readily appreciate the novel and highly unique advantages of this invention. Most importantly, novel film products are provided which may be employed in a camera of the self-developing type to provide substantially waste-free operation. Also, these novel film products are substantially less expensive to produce than those heretofore devised for use in diffusion-transfer photographic processes of a similar type.

This invention may be practiced or embodied in other ways without departing from the spirit or essential character thereof. For instance, in an alternate arrangement each sheet 12 may comprise both a photosensitive image-recording component and an image-receiving component. In such instance, the camera would include an arrangement for exposing the sheet 12 prior to superposing it over a respective sheet 10. The preferred embodiments described herein are therefore illustrative and not restrictive, the scope of the invention being indicated by the appended claims and all variations which come within the meaning of the claims are intended to be embraced therein.

What is claimed is:

1. A photographic product useful in treating exposed photographic sheet materials with processing fluid comprising:
    a plurality of sheets;
    means interposed between adjacent said sheets for connecting said sheets into an elongated strip of said sheets and said connecting means;
    a container carried by each said connecting means intermediate of and spaced apart from the portions thereof attached to adjacent said sheets for releasably retaining a quantity of such processing fluid at least sufficient to cover one of said sheets adjacent thereto and for releasing such fluid therefrom in the direction of said one adjacent sheet responsive to a compressive force being applied thereto;
    means carried by each said connecting means and covering at least a portion of said connecting means associated therewith intermediate said container associated therewith and said one sheet associated therewith for controlling the flow of such fluid onto said one associated sheet as it is released from said associated container; and
    means carried by each said connecting means and covering at least a portion of said connecting means associated therewith intermediate said container associated therewith and the other of said sheets associated therewith for trapping any processing fluid released from said container associated with the other said connecting means attached to said other sheet associated with said first-mentioned connecting means in excess of that applied onto said other sheet associated with said first-mentioned connecting means during the progressive application of such force across said container associated with said other connecting means and said other sheet associated with said first-mentioned connecting means.

2. The photographic product of claim 1 wherein each said sheet comprises a photosensitive image-recording component.

3. The photographic product of claim 1 wherein said product comprises flexible materials rendering it coilable into a roll.

4. The photographic product of claim 1 wherein the edge of each said fluid flow controlling means furthermost removed from its associated said container extends into overlapping relationship to a portion of its associated said one sheet.

5. The photographic product of claim 1 wherein the edge of each said trapping means furthermost removed from its associated said container extends into underlapping to a portion of its associated said other sheet.

6. The photographic product of claim 1 wherein each said fluid flow controlling means comprises a bib having opposed edges, extending longitudinally along said elongated strip, which are attached to its associated said connecting means.

7. The photographic product of claim 1 wherein each said trapping means comprises sheet material having opposed edges extending longitudinally along said elongated strip which are attached to its associated said connecting means.

8. The photographic product of claim 1 wherein each said fluid flow controlling means and its associated said trapping means are formed of a single sheet of material.

9. The photographic product of claim 8 wherein said single sheet of material has a pair of opposed edges extending longitudinally along said elongated strip and is attached to the assembly comprising said connecting means and said container along each of its said edges and along a relatively narrow line extending laterally thereacross intermediate its said edges and extending from one of its said edge attachments to the other.

10. The photographic product of claim 1 wherein said container is formed independently of said connecting means, said fluid flow controlling means and said fluid-trapping means.

11. The photographic product of claim 8 wherein the walls of said container comprise sections of said single sheet of material and said connecting means.

12. A photographic product comprising:
    a carrier sheet having a pair of spaced apart lateral edges;
    a container of processing fluid mounted on said carrier sheet intermediate of and spaced apart from said lateral edges thereof adapted to release said fluid in a predetermined manner towards one of said lateral edges responsive to compressive force being applied thereto; and
    a trapping sheet attached to the assembly comprising said carrier sheet and said container to overlie at least a portion of said carrier sheet intermediate said container and the other of said lateral edges and to cooperate therewith to provide a space between said trapping sheet and said carrier sheet in which a small amount of processing fluid may eventually be accumulated.

13. The photographic product of claim 12 wherein said trapping sheet has an edge substantially coextensive with said other lateral edge of said carrier sheet and which is attached to said assembly substantially around its entire periphery except along its said edge.

14. The photographic product of claim 12 additionally including a bib attached to the assembly comprising said carrier sheet and said container to overlie at least a portion of said carrier sheet intermediate said container and said one lateral edge of said carrier sheet and to cooperate therewith to control the flow of said fluid as said fluid is released from said container.

15. The photographic product of claim 14 wherein said bib has an edge substantially coextensive with said one lateral edge of said carrier sheet and said bib is attached to said assembly substantially around its entire periphery except along its said edge.

16. The photographic product of claim 14 wherein said bib and said trapping sheet are formed from a single sheet of material.

17. The photographic product of claim 14 wherein said container is formed independently of said carrier sheet, said bib and said trapping sheet.

18. The photographic product of claim 16 wherein at least one wall of said container comprises a section of said single sheet of material.

19. The photographic product of claim 14 wherein at least one wall of said container comprises a section of said carrier sheet.

References Cited

UNITED STATES PATENTS

| | | | |
|---|---|---|---|
| 2,579,587 | 12/1951 | Land | 96—78 X |
| 2,686,716 | 8/1954 | Land | 96—78 X |
| 3,270,653 | 9/1966 | Bachelder | 96—78 X |

NORMAN G. TORCHIN, Primary Examiner

A. T. SURO PICO, Assistant Examiner

U.S. Cl. X.R.

96—76 C